(12) United States Patent
Lewis et al.

(10) Patent No.: US 12,039,575 B1
(45) Date of Patent: *Jul. 16, 2024

(54) APPLYING SOCIAL INTERACTION-BASED POLICIES TO DIGITAL MEDIA CONTENT

(71) Applicant: Google LLC, Mountain View, CA (US)

(72) Inventors: Justin Lewis, Marina del Rey, CA (US); Kevin Greene, San Francisco, CA (US)

(73) Assignee: Google LLC, Mountain View, CA (US)

( * ) Notice: Subject to any disclaimer, the term of this patent is extended or adjusted under 35 U.S.C. 154(b) by 341 days.

This patent is subject to a terminal disclaimer.

(21) Appl. No.: 17/209,140

(22) Filed: Mar. 22, 2021

Related U.S. Application Data

(63) Continuation of application No. 14/629,203, filed on Feb. 23, 2015, now Pat. No. 10,956,945.
(Continued)

(51) Int. Cl.
| | |
|---|---|
| *G06Q 30/00* | (2023.01) |
| *G06Q 30/0241* | (2023.01) |
| *G06Q 30/0242* | (2023.01) |
| *G06Q 50/00* | (2012.01) |
| *G06Q 50/18* | (2012.01) |

(52) U.S. Cl.
CPC ..... *G06Q 30/0276* (2013.01); *G06Q 30/0246* (2013.01); *G06Q 50/01* (2013.01); *G06Q 50/184* (2013.01)

(58) Field of Classification Search
CPC ........... G06Q 30/0276; G06Q 30/0246; G06Q 50/01; G06Q 50/184
See application file for complete search history.

(56) References Cited

U.S. PATENT DOCUMENTS

| | | |
|---|---|---|
| 8,094,872 B1 | 1/2012 | Yagnik et al. |
| 8,209,396 B1 | 6/2012 | Raman et al. |

(Continued)

OTHER PUBLICATIONS

M. T. Andrade et al., "Using context to assist the adaptation of protected multimedia content in virtual collaboration applications," 2007 Intl Conf on Collaborative Computing: Networking, App and Worksharing (Collaborate Com 2007), New York, NY, USA, 2007, pp. 233-242, doi: 10.1109/COLCOM.2007.4553835 (Year: 2007).*
(Continued)

*Primary Examiner* — Sun M Li
(74) *Attorney, Agent, or Firm* — Lowenstein Sandler LLP

(57) ABSTRACT

Social interaction-based policies are provided to a digital content owner and are applied to uploaded content matching digital content owned by the digital content owner. Social interaction-based policies enable the content owner to obtain various benefits to the content owned by the content owner within a video hosting site and outside the video hosting site. The benefits include using content owner's successful digital content to drive traffic or subscriptions to content owner's social interaction platforms and increase engagement with viewers of the digital content within and outside the video hosting site. The social interaction-based policies also enable content uploaders of digital content matching content owned by others to participate in sharing revenue generated from their uploaded videos subject to social interaction-based policies applied to the uploaded videos.

20 Claims, 4 Drawing Sheets

Related U.S. Application Data

(60) Provisional application No. 61/943,874, filed on Feb. 24, 2014.

(56) References Cited

U.S. PATENT DOCUMENTS

| | | | |
|---|---|---|---|
| 8,464,302 B1 | 6/2013 | Liwerant | |
| 8,611,422 B1 | 12/2013 | Yagnik | |
| 9,741,080 B1* | 8/2017 | Byrne | G06Q 40/00 |
| 2008/0027867 A1 | 1/2008 | Forbes et al. | |
| 2008/0275763 A1* | 11/2008 | Tran | H04N 21/8358 |
| | | | 705/1.1 |
| 2011/0060994 A1* | 3/2011 | Maxwell | H04L 67/306 |
| | | | 715/764 |
| 2011/0131141 A1* | 6/2011 | Steelberg | G06Q 30/0276 |
| | | | 705/310 |
| 2011/0276449 A1* | 11/2011 | Funderburk | G06Q 30/06 |
| | | | 705/34 |
| 2013/0036355 A1 | 2/2013 | Barton | |
| 2013/0166580 A1* | 6/2013 | Maharajh | G06Q 30/0244 |
| | | | 707/758 |
| 2013/0218668 A1* | 8/2013 | Parekh | H04N 21/252 |
| | | | 705/14.45 |
| 2013/0302005 A1 | 11/2013 | Harwell et al. | |
| 2013/0347056 A1* | 12/2013 | Kuhlman | H04L 9/40 |
| | | | 726/1 |
| 2014/0258267 A1* | 9/2014 | Lin | G06F 16/5866 |
| | | | 707/722 |

OTHER PUBLICATIONS

Z. Liu, D. Gibbon and B. Shahraray, "Uninterrupted Recording and Real Time Content-Based Indexing Service for IPTV Systems," 2008 5th IEEE Consumer Communications and Networking Conference, Las Vegas, NV, USA, 2008, pp. 648-652, doi: 10.1109/ccnc08.2007.149. (Year: 2007).*

R. Wishart, D. Corapi, S. Marinovic and M. Sloman, "Collaborative Privacy Policy Authoring in a Social Networking Context," 2010 IEEE International Symposium on Policies for Distributed Systems and Networks, Fairfax, VA, USA, 2010, pp. 1-8, doi: 10.1109/POLICY.2010.13. (Year: 2010).*

S. Sundareswaran and A. C. Squicciarini, "Privacy through web-traveler policies in social network environments," 7th International Conference on Collaborative Computing: Networking, App and Worksharing, Orlando, FL, USA, 2011, pp. 466-472, doi: 10.4108/icst.collaboratecom.2011.247169 (Year: 2011).*

* cited by examiner

APPLYING SOCIAL INTERACTION-BASED POLICIES TO DIGITAL MEDIA CONTENT

CROSS REFERENCE TO RELATED APPLICATIONS

This application is a continuation application of co-pending U.S. patent application Ser. No. 14/629,203 filed Feb. 23, 2015, which claims the benefit of U.S. Provisional Application No. 61/943,874, filed on Feb. 24, 2014, each of which is incorporated by reference in its entirety.

TECHNICAL FIELD

The disclosure relates generally to the field of digital media content sharing, and specifically to applying social interaction-based policies to digital media content provided by an entity in which other entities have rights.

BACKGROUND

The development of digital media content sharing and Internet social networking has enabled many features to enhance the user experience. However, the proliferation of digital media hosting sites that allow users to upload digital content (e.g., music content and video content) for mass viewing has highlighted a number of challenges including identification of user-generated digital content in which other entities have rights, and mechanisms that facilitate the ability of those entities to control and to generate revenue from the user-generated digital content.

A single work (e.g., a sound track or movie) may have multiple rights holders (e.g., the author, publisher, content distributor) and various entities may hold other rights with regard to the content. Currently existing digital content sharing solutions provide rights holders with limited options for specifying how to handle user-generated content matching content owned by the rights holders. For example, a rights holder may allow the content or ask hosting sites to take down the content or show pre-roll advertisement prior to the playing of the content.

SUMMARY

Described embodiments enable application of a social interaction-based policy to digital content in a video sharing environment. Content owners assign policies to their content. When content uploaded by a user is found to match that of a content owner, the policy specified by the content owner for the use of that content is identified and applied to the content.

One type of policy that a content owner can select is a social interaction-based policy, which specifies social interaction opportunities to be presented to viewers of the uploaded digital content. The social interaction-based policy enables the content owner to drive traffic or subscriptions to content owners' social networking platforms and increase engagement with viewers of the digital content within and outside a video hosting site.

One embodiment includes a social interaction-based policy sub-system, which allows content owners to assign social interaction-based policies to their content. A social interaction-based policy specifies social interaction opportunities to be presented to viewers of uploaded digital content that matches reference content of a content owner. The social interaction opportunities enable the viewers of the uploaded digital content to interact with the uploaded digital content. The social interactions with the updated digital content by the viewers, such as following the content owner on the same or different social network by the viewers, increasing a count favorable to the official versions of the uploaded content, benefit the content owner with increased subscription to the content owner's social networking platforms and increased engagement with viewers of the digital content within and outside the video hosting site.

In various embodiments, uploaders of the content may also participate in a revenue sharing opportunity, for example by receiving a portion of advertising revenue from ads displayed when viewers view the content.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The Figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

Figure 1:
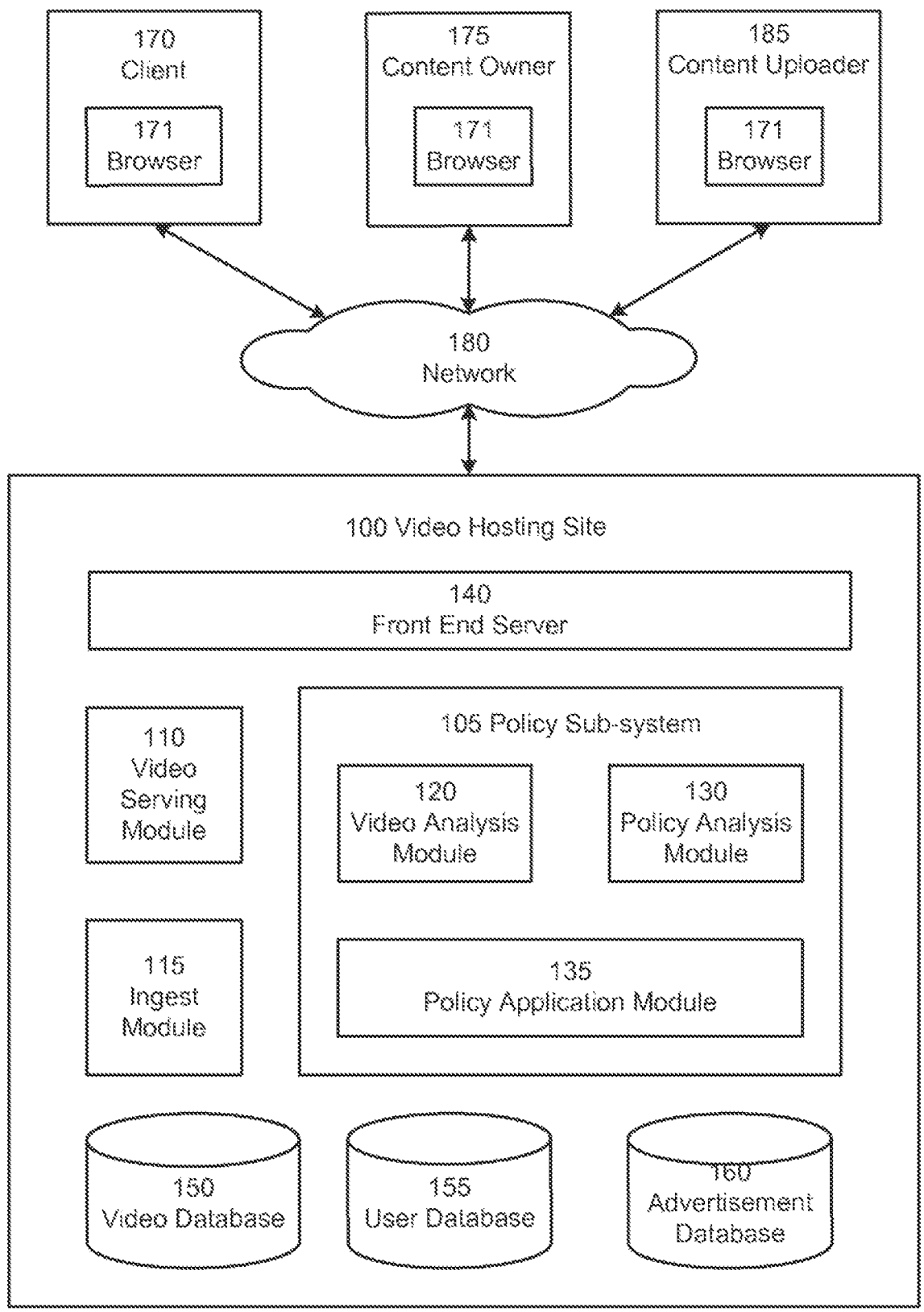
FIG. 1 is a block diagram of a computing environment for applying social interaction-based policies to digital content matching content owned by others according to one embodiment.

FIG. 1 shows a computing environment for applying social interaction-based policies to uploaded digital content matching content owned by others according to one embodiment. The computing environment includes a video hosing site 100 in communication with a client device 170, a content owner 175 and a content uploader 185 over a network 180. Only one video hosting site 100, one client device 170, one content owner 175 and one content uploader 185 are shown in FIG. 1 to simplify and clarify the description. Implementations of the computing environment can have many client devices 170, content owners 175 and content uploaders 185 connected to the video hosting site 100 via the network 180. Likewise, the functions performed by the various entities of FIG. 1 may differ in different embodiments.

A client 170 executes a browser 171 to view digital content and is connected to a front end server 140 of the video hosting site 100 via a network 180. A client device 170 is an electronic device used by a user to perform functions such as viewing digital content, uploading and downloading digital content to and from video hosting sites, executing software applications, browsing sites hosted by web servers on the network 180, and interacting with the front end server 140 of the video hosting site 100. For example, the client device 170 may be a personal computer, a smart phone, or a tablet, notebook, or desktop computer. The client device 170 includes and/or interfaces with a display device on which the user may view digital content. In addition, the client device 170 provides a user interface (UI), such as physical and/or on-screen buttons, with which the user may interact with the client device 170 to perform functions such as consuming digital content, selecting digital content, downloading digital content, and uploading digital content.

The browser 171 can include any application that allows users of client 170 to access web pages on sites. The browser 171 can also include a video player adapted for the video file formats used in the video hosting site 100. Alternatively, videos can be accessed by a standalone program separate from the browser 171. A user can access a video from the video hosting site 100 by browsing a catalog of videos, conducting searches on keywords, reviewing play lists from other users or the system administrator (e.g., channels formed by collections of videos), or viewing videos associated with particular user groups (e.g., communities).

A content owner 175 is an entity that owns or controls at least some of the rights to a particular work of digital content. The content owner 175 may be an individual, a group of individuals, or an entity such as a music or video production company or studio or artists' group. The content owner 175 provides digital reference content to the video hosting site 100 via the network 180. The content owner 175 specifies one or more social interaction-based policies for user-generated digital content that matches the digital reference content owned or managed by the content owner 175. The content owner 175 also determines whether to monetize digital content that matches the reference content owned, for example by enabling advertisements to be displayed in conjunction with the digital content items and collecting some or all of the revenue generated by the advertisement displays.

A content uploader 185 is an entity that uploads user-generated digital content, which in some instances includes content that is subject to the rights of others. For example, user-generated digital content may include content that matches some reference content, e.g., a portion of a sound track, a cover of a song or a trailer for a movie, which is owned by another party.

Content owners 175 and content uploaders 185 provide digital content to the video hosting site 100. In this disclosure, "digital content" or "digital media content" generally refers to any machine-readable and machine-storable work. Digital content can include, for example, video, audio or a combination of video and audio. Alternatively, digital content may be a still image, such as a JPEG or GIF file or a text file. For purposes of simplicity and the description of one embodiment, the uploaded digital content will be referred to as a "video," "video files," or "video items," but no limitation on the type of digital content that can be uploaded are indented by this terminology. Thus, the operations described herein for applying social interaction-based policies to video content can be applied to any type of digital content, including videos and other suitable types of digital content such as audio files (e.g. music, podcasts, audio books, and the like), documents, websites, images, multimedia presentations, and others.

The network 180 enables communication between the video hosting site 100, the client device 170, the content owner 175 and the content uploader 185 and may be the Internet, another wide area network, a local area network, or the like. The various communication technologies and protocols for network implementation may be selected by the implementer from among conventionally known methodologies.

The video hosting site 100 stores digital content provided by the content owner 175 and content uploader 185. The site 100 enables content owner 175 to specify social interaction-based policies for uploaded digital content matching reference content, and then implements those policies when matching content is encountered. A suitable system for implementation of the video hosting site 100 is the YOUTUBE™ website, found at www.youtube.com; other video hosting sites are known as well, and can be adapted to operate according to the teaching disclosed herein. It will be understood that the term "site" represents any computer system adapted to serve digital content using any internetworking protocols, and is not intended to be limited to content uploaded or downloaded via the Internet or the HTTP protocol.

In the embodiment shown in FIG. 1, the video hosting site 100 has a front end server 140, a video serving module 110, an ingest module 115, a video database 150, a user database 155, an advertisement database 160 and a social interaction-based policy sub-system 105. The policy sub-system 105 has a video analysis module 120, a policy analysis module 130 and a policy application module 135. Embodiments of the video hosting site 100 can have additional or different modules. Likewise, the functions performed by the various entities of the video hosting site 100 may differ in different embodiments.

The front end server 140 of the video hosting site 100 provides one or more interfaces that enable the client 170, the content owner 175 and the content uploader 185 to interact with the video hosting site 100. To upload videos to the video hosting site 100, the content owner 175 and content uploader 185 connect to the front end server 140. The front end server 140 receives videos uploaded to the site 100 by the content owner 175 and/or the content uploader 185 and stores the videos in the video database 150 and user information associated with the content owner 175 and the content uploader 185 in the user database 155 for further processing.

The front end server 140 also enables the interaction between the users of the client's 170 and the video hosting site 100. In one embodiment, users of client 170 execute a browser 171 and connect to the front end server 140 to view the videos that have been uploaded by the content owner 175 and/or the content uploader 185. Users of client 170 can search for videos based on keywords, tags or other metadata. The front end server 140 receives user search requests as user queries and provides the queries to the video serving module 110 to locate videos that satisfy the user queries.

The video serving module 110 searches the video database 150 for videos that satisfy user queries and provides the videos to the users through the front end server 140. The video serving module 110 supports searching on one or more fielded data for a video, including its title, description, tags, author, category and so forth. Alternatively, users can browse a list of videos based on categories of videos such as most viewed videos, sports, animals, or automobiles. The video serving module 110 also serves videos modified by the social interaction-based policies to the users of the client 170. Modifying an uploaded video by social interaction-based policies is further described below with reference to FIGS. 2-4.

The ingest module 115 processes the videos uploaded to the video hosting site 100 and stores the processed videos in the video database 150. In one embodiment, the ingest module 115 standardizes an uploaded video by transcoding the uploaded video, compressing the video, tagging the video and performing other video processing steps to the video. The videos processed by the ingest module 115 allow the video hosting site 100 to receive videos in various formats while still being able to provide standardized outputs for playback to users of client 170.

The video database 150 stores videos uploaded by the content owner 175 and the content uploader 185 and stores videos processed by the ingest module 115. Additionally, the video database 150 is for storing metadata associated with the uploaded videos. In one embodiment, each uploaded video is assigned a video identifier (ID) by the ingest module 115. Each video is stored as a video file with metadata associated with the file such as a video ID, artist, video title, label, genre, time length, and optionally geo-restrictions that can be used for data collection or content blocking on a geographic basis.

The user database 155 stores information of registered users of the video hosting site 100. Registered users may include content owner 175, content uploader 185 and/or users who view videos on the video hosting site 100. In one embodiment, account information of a registered user including login name, electronic mail (e-mail) address and password with the video hosting site 100 is stored in the user database 155. Additionally, the user database 155 stores a user's infraction information indicating the number of received violations, type of violations and date of the violation. Infractions are violations of the rules of conduct of the video hosting site 100 which can be used to determine revenue sharing discussed below. Similar to the video database 150, the user database 155 may be partitioned to separately store user information associated with the content owner 175, user information associated with the content uploader 185 and user information associated with the users of the client 170.

In situations in which the systems discussed here collect personal information about users, or may make use of personal information, the users may be provided with an opportunity to control whether programs or features collect user information (e.g., information about e-books a user has read, a user's social network, social actions or activities, profession, a user's preferences, or a user's current location), or to control whether and/or how to receive content from the video hosting site 100 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the video hosting site 100.

The video hosting site 100 also has a social interaction-based policy sub-system 105 for content owner 175 to specify social interaction-based policies for uploaded digital content matching the reference content owned by the content owner 175 and for applying associated social interaction-based policies to identified digital content uploaded by the content uploader 185. For the content owner 175, the policy sub-system 105 is configured to enable content owners 175 to drive traffic or subscriptions to the content owner's social networking platforms and to increase engagement with viewers of the digital content within the video hosting site 100 and outside the video hosting site 100. The policy sub-system 105 is further configured to enable the content uploaders 185 to participate in monetization process through their uploaded videos that match reference content owned by the content owners 175 subject to social interaction-based policies applicable to the uploaded videos. In the embodiment illustrated in FIG. 1, the policy sub-system 105 includes a video analysis module 120, a policy analysis module 130 and a policy application module 135. Other embodiments of the policy sub-system 105 may have additional and/or different modules.

The video analysis module 120 is for analyzing a video uploaded to the video hosting site 100 against the videos stored in the video database 150 and for determining whether the content included in the uploaded video matches any reference content owned by another entity and degree of the match. In one embodiment, the video analysis module 120 is configured to generate a digital fingerprint of the uploaded video and determine whether the digital fingerprint of the uploaded video matches one or more digital fingerprints of the reference content. In another embodiment, the video analysis module 120 analyzes a sample of the uploaded video using a machine learning algorithm against the reference content stored in the video database 150 to determine the match. Other embodiments may apply other schemes known to those of ordinary skills in the art to determine match between an uploaded video and reference content. Examples of these embodiments include some described in U.S. Pat. Nos. 8,611,422 and 8,094,872, each of which is incorporated by reference herein in its entirety.

The policy analysis module 130 enables content owners of reference content to specify at least one policy for each item of reference content. The specified policy is to be applied to uploaded videos matching the reference content. In one embodiment, the policy analysis module 130 provides four types of policies for a content owner of reference content to specify for a matching uploaded video: take down the matching uploaded video, allow the matching uploaded video, monetize the matching uploaded video and present one or more social interactions opportunities to a viewer of the matching uploaded video. In response to an uploaded video matching reference content, an indicator of a policy that is to be applied to the uploaded video is stored, e.g., with the video metadata.

The policy of taking down a matching uploaded video allows a content owner of the reference content to instruct the video hosting site 100 to remove the uploaded video from the video hosting site 100.

The policy of allowing a matching uploaded video results in the video hosting site 100 allowing content that matches reference content to be made available nonetheless for viewing by other users. In various embodiments, user database 155 is updated to reflect that the uploading user contributed content to which he did not have rights, which may be a metric that is tracked, e.g., to determine whether to allow a user into a revenue sharing program.

The policy of monetizing the matching uploaded video allows a content owner to instruct the video hosting site 100 to monetize the matching uploaded video. Monetization is a process to determine whether the uploaded digital content from a party is eligible to generate revenue and which parties are eligible to participate in revenue sharing from the uploaded digital content. Examples of embodiments of digital content monetization include some described in U.S. Application Publication No. 2008/0275763, which is incorporated by reference herein in its entirety. One source of revenue from the matching uploaded video for a content owner of the reference content is from the advertisements inserted in the matching uploaded video. Generally, only the content owner of the reference content and the video hosting site 100 are to share the revenue generated from the matching uploaded content, to the exclusion of the uploading user.

A social interaction-based policy enables a content owner to present various social interactions opportunities to a viewer of the matching uploaded video. One example of the benefit to the content owner is to use the content owner's successful videos to drive traffic or subscriptions to the content owner's social networking platforms, such as a FACEBOOK™ page or TWITTER™ page, web pages of his/her official sites, etc. Another example of the benefit to the content owner is to increase engagement with viewers of the reference content within and outside the video hosting site 100.

As shown above, the policies of taking down, allowing and monetizing the matching uploaded digital content generally exclude the uploaders of the matching content from participating in any sharing of revenue, and do not serve to drive viewers to content owners' channels or otherwise create engagement with the content owners. For example, uploading a copy of a music video to which a third party has rights might ordinarily lead to either a takedown, no action, or monetization, but no engagement with the songwriter or her other works.

Compared to the other three types of policies described above, the social interaction-based policy provides an added benefit to the uploaders of videos matching content owned by others. The social interaction-based policy allows the uploaders of an uploaded video matching content owned by others to share revenue generated from the advertisements on the uploaded video subject to the social interaction-based policies selected by the content owners of the reference content. For example, if a songwriter chooses to show a GOOGLE™+1 button for the cover version of her music instead of showing a pre-roll advertisement, the uploader of the cover version of her music can still monetize the cover version, e.g. from the advertisements added to the cover version. The songwriter also benefits from the interaction with the cover version through GOOGLE™+1 button because, as described further below, clicking the button by a viewer of the cover version is calculated as part of the overall likes of the original content, rather than the uploaded content next to which the +1 button is displayed.

In one embodiment, the policy analysis module 130 offers different social interaction opportunities that can be specified by a content owner of reference content within the social interaction-based policy. Examples of social interaction opportunities that can be presented to a viewer of an uploaded video matching at least a portion of the reference content include:

Follow the content owner of the reference content on the same social network by a viewer of the uploaded video, e.g., a subscription to the official music video channel of the content owner on the video hosting site;

Follow the content owner of the reference content on a different social network by a viewer of the uploaded video, e.g., Facebook/Google+/Twitter follow of the web pages of the content owner's music band;

Like the official version of the uploaded video by clicking a "Like" button on the uploaded video that increases a count favorable to the official version, e.g., a YouTube Like, Google++1, REDDIT™ up vote or Facebook Like Dislike the uploaded video by clicking a "Dislike" button on the uploaded video that increases a count favorable to the official version—for example, where the uploaded content is an unofficial cover of the original content;

Re-share or re-tweet the official post containing the official version of the uploaded video by a viewer of the uploaded video;

Comment on the reference content (i.e., the official music video) by a viewer of the uploaded video, where the comment stream may ingest comments from other social networks, e.g., GOOGLE+ posts ingested into a comment stream from the video hosting site hosting the uploaded video;

Share the reference content by a viewer of the uploaded video; and

Endorse the reference content by a viewer of the uploaded video so that the endorsement or review can be used in an advertisement to be inserted in the uploaded video.

The different social interaction opportunities specified in a social interaction-based policy offer flexibility and a different avenue in controlling an uploaded digital content matching the reference content through social interactions opportunities presented to a viewer of the uploaded digital content. For example, inserting a "Like" button while playing a cover version of an official version of a music video may increase the feed, search and related ranking of the official version of the music video, which in turn may increase the sale of the official sound track for the owner of the official sound track.

The different social interaction opportunities specified in a social interaction-based policy also provide the uploaders of the uploaded digital content matching reference content an opportunity to generate some revenue from the uploaded digital content. Using the same example described above, inserting a "Like" button while playing a cover version of an official version of a music video does not prevent the uploaders of the cover version from adding pre-roll advertisements on the cover version and sharing revenue generated from the pre-roll advertisements with the video hosting site 100.

In various embodiments, to provide different policy options to a content owner, the policy analysis module 130 presents a graphical user interface (GUI) to the content owner to select one or more policies to control an uploaded video matching the reference content. In one embodiment, the content owner specifies at least one policy for each item of reference content it provides to a digital content hosting site, e.g., the video hosting site 100. In each policy, the content owner further specifies one or more social interaction opportunities to be presented to viewers of an uploaded digital content matching the item of the reference content. In another embodiment, the content owner specifies a group policy for all the digital content created by a particular user. For example, every song or album by a particular artist, e.g., Lady Gaga, can have the same policy specified by the artist.

In one embodiment, the policy analysis module 130 presents the policy GUI to a content owner of reference content in response to the reference content being uploaded and analyzed in the video hosting site 100. In another embodiment, the policy analysis module 130 presents the policy GUI to a content owner of reference content in response to a digital representation of the reference content (e.g., a digital signature of the reference content) being generated.

Figure 2:
FIG. 2 is an exemplary graphical user interface that enables rights owners to specify one or more policies according to one embodiment.

FIG. 2 is an exemplary graphical user interface (GUI) 200 that allows a content owner to specify policies according to one embodiment. In the embodiment illustrated in FIG. 2, the GUI 200 includes some metadata of reference digital content owned by the content owner and various policy options 204-210 that can be selected by the content owner. The example metadata of the reference content include reference content owner 202, reference content ID 204, reference content type 206 and reference content name 208. Other embodiments may include additional or different metadata of the reference content.

The embodiment illustrated in FIG. 2 includes five policy options. Policy option 1 (210) allows the digital content (e.g., an uploaded video) matching the reference content to be published without additional restrictions or monetization. In some embodiments, as indicated above, internal metrics may be updated in the user's account to reflect that the user has uploaded content to which the user does not have rights. Policy option 2 (212) requires the video hosting site 100 to take down or otherwise block from viewing the matching digital content. Policy option 3 (214) permits the uploaded video to remain viewable on the site 100, and allows the content owner to generate revenue from the matching digital content, such as sharing revenue generated from the advertisements inserted on the matching digital content with a video hosting site.

Policy option 4 (216) is a social interaction-based policy that allows the content owner to specify one or more social interactions opportunities to be presented to a viewer of an uploaded video matching the reference content. The content owner may select more than one social interaction from a list of social interactions including: following the content owner on the same social network, on a different social networking, adding a "Like" button on the matching uploaded digital content, re-sharing or re-tweeting a post containing a link to the official version of the digital content, commenting on an official version of the content, sharing an official version of the content and/or endorsing an official version of the matching uploaded digital content, where the endorsement can be included in the advertisements to be inserted in the matching uploaded digital content.

Group policy (218) allows the content owner to make the selections applicable to an entire group or class of reference content, e.g., every song or album from a particular artist, every artist managed by the content owner, etc. In various embodiments, additional user interface screens (not shown) may be provided to the content owner to enable this functionality, e.g., by providing a list of content administered by the content owner to which the group policy may be applied. The group policy can be a policy selected from the four policy options described above. Other embodiments of the GUI 200 may include other social interaction-based policy options and each social interaction-based policy may have its own graphical user interface when presented to a content owner.

Referring back to the policy sub-system 105 of the video hosting site 100, the policy application module 135 of the sub-system 105 applies the policies selected by a content owner of reference content to an uploaded video that matches the reference content. The policy application module 135 interacts with the policy analysis module 130 to receive the policies selected by the content owner and identification of the uploaded video, to which the selected policies are to be applied. The policy application module 135 modifies the presentation of the uploaded video, e.g., by inserting social interaction links, in accordance with the selected policies.

In response to a policy of taking down the identified uploaded video, the policy application module 135 instructs the front end server 140 to take down the uploaded video. The front end server 140 removes the uploaded video from the video database 150 and records a count of violation associated with the content uploader of the uploaded video in the user database 155. The front end server 140 may notify the uploader of the uploaded video regarding taking down the uploaded video. Alternatively, the front end server 140 blocks the video from viewing by other users but does not delete it from the server for some period of time, e.g., to allow the user to revise the video and eliminate the matching content. Examples of alternative embodiments of the front end server include some described in U.S. Pat. No. 8,572,121, which is incorporated by reference herein in its entirety.

Responsive to the content owner's selection of allowing the uploaded video, the policy application module 135 instructs the front end server 140 to store the uploaded video in the video database 150 and mark the uploaded video as not eligible for generating revenue. The front end server 140 may record a count of violation associated with the content uploader of the uploaded video in the user database 155 for reference.

The policy of monetizing the uploaded video allows a content owner of the reference content to generate monetary gains from the uploaded video. In response to the content owner's selection of monetization policy, the policy application module 135 instructs the front end server 140 to launch a monetization process with the matching uploaded video. In one embodiment, the policy application module 135 selects one or more suitable advertisements from the advertisement database 160 of the video hosting site 100 and renders the selected advertisements on or beside the uploaded video. In another embodiment, the policy application module 135 receives different bids from various advertisers who bid to insert their advertisements on the uploaded video and selects one or more advertisements from the advertiser submitted advertisements based on the bids. One type of the selected advertisements is pre-roll advertisements inserted on the uploaded video and the pre-roll advertisements are displayed before a viewer watches the content of the uploaded video. Additional description of monetization options are described in U.S. Application Publication No. 2008/0275763, which is incorporated by reference herein in its entirety.

To apply a social interaction-based policy to an uploaded video, the policy application module 135 changes how the uploaded video is to be presented and consumed by including a variety of means to enable the social interaction opportunities specified in the policy. For example, in response to the content owner selecting following the content owner on the same social network, the policy application module 135 inserts a "Follow" button on each video frame of the uploaded video. The "Follow" button on a video frame of the uploaded video embeds a link to the subscription webpage of the content owner's official music video channel on the same video hosting site that hosts the uploaded video. Similarly, the policy application module 135 modifies the uploaded video to add a "Follow" button that links to the official video channel of the content owner across different social networks.

To enable re-sharing or re-tweeting official post containing an official version of the uploaded video, the policy application module 135 modifies the presentation of the uploaded video by inserting the official post next to the uploaded video and means to launch sharing and tweeting of the official post, such as a button linking to a viewer's Twitter account. Similarly, the policy application module 135 changes the presentation of the uploaded video to enable commenting on, sharing and endorsing an official version of the uploaded video in accordance with the similar principles.

Figure 3:
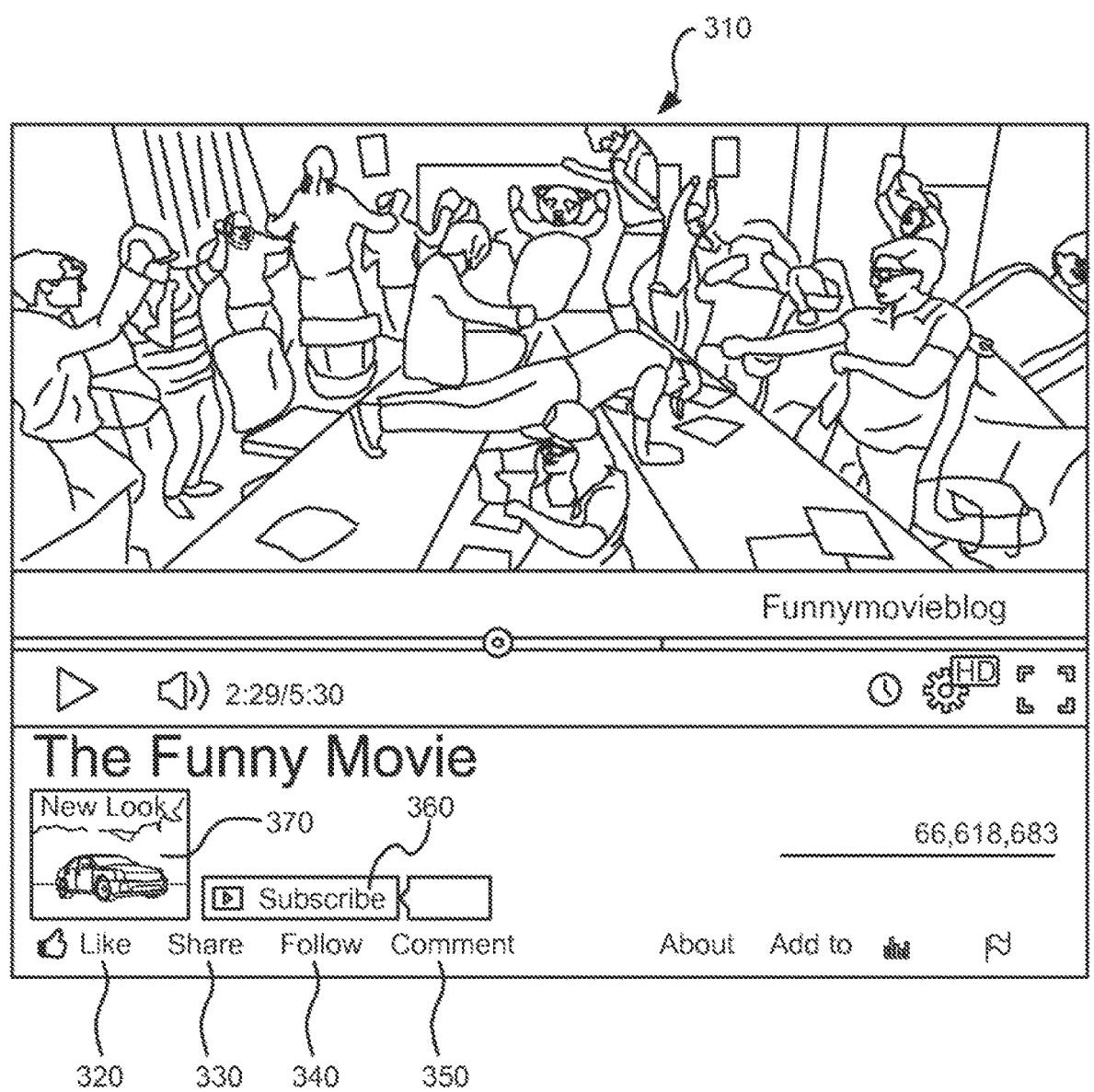
FIG. 3 is an example of policy options applied to an uploaded video matching content owned by another according to one embodiment.

FIG. 3 is an example of policy options applied to an uploaded video matching reference content owned by another according to one embodiment. FIG. 3 illustrates a video frame 310 of the video, "The Funny Movie," uploaded by a user. For illustration purpose, assuming that the video matches at least a portion of an official video of "The Funny Movie" owned by another party. The video frame 310 of the uploaded video contains multiple graphical representations of policies selected by the party who owns the reference content matched by the video. The graphical representations of policies that can be applied to the uploaded video include social interaction-based policy, such as "Like" button 320, which allows a viewer to click the button and each clicking increases a count favorable to the official version of "The Funny Movie." The graphical representations of other social interactions include a "Share" button 330, a "Follow" button 340, a "Comment" button 350 and a "Subscribe" 360, which allow a viewer of the uploaded video to share, follow, comment and/or subscribe to an official version of the video.

In addition to social interaction-based policies, the party who owns the official version of the video matched by the uploaded video may choose to monetize the uploaded video by adding an advertisement 370 (e.g., showing a new look of a brand name car) below the video frame 310 of the uploaded video), or by adding a pre-, mid-, or post-roll advertisement to the video, etc.

Figure 4:
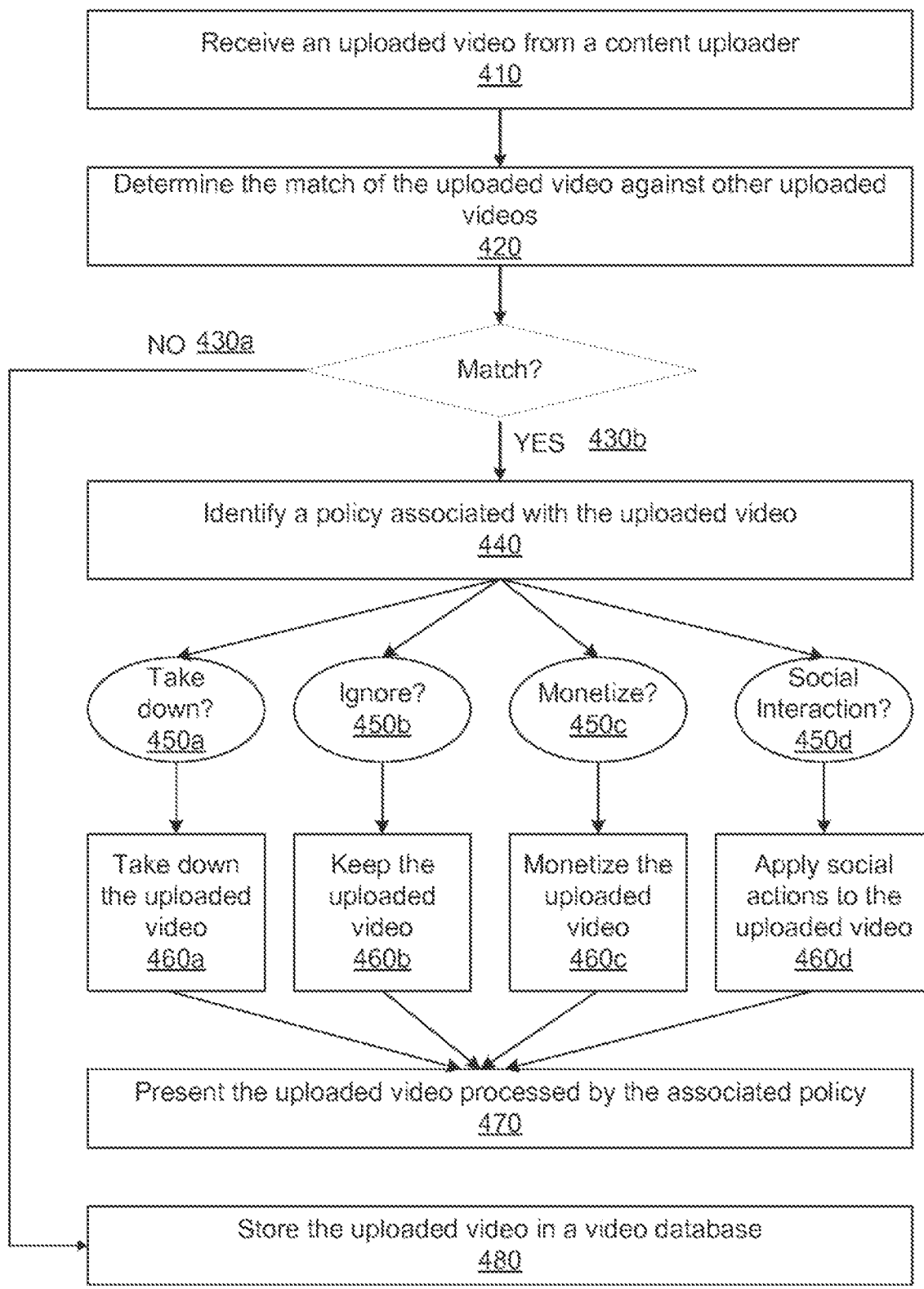
FIG. 4 is a flowchart illustrating a process for applying social interaction-based policies to an uploaded video according to one embodiment.

FIG. 4 illustrates the steps of the process by the social interaction-based policy subsystem 105. However, some or all of the steps may be performed by other entities. In addition, some embodiments may perform the steps in parallel, perform the steps in different orders, or perform different steps.

Initially, the sub-system 105 receives 410 an uploaded video, e.g., a user-generated music video, from a content uploader. The video analysis module 120 determines 420 whether the uploaded video matches reference content stored in the video database 150 of the video hosting site 100, e.g., by comparing the digital fingerprint of the uploaded video with a stored fingerprint identified as claimed by a content owner. Responsive to no match between the uploaded video and any other videos 430a, the policy sub-system 105 stores 480 the uploaded video in the video database 150 for consumption by users of the video hosting site 100. Responsive to a match between the uploaded video and another video 430b, the video analysis module 120 queries the policy analysis module 130 for the policy associated with the identified content. The policy analysis module 130 identifies 440 at least one policy associated with the uploaded video.

The policy application module 135 then applies the policies selected by the content owner. Responsive to a policy 450a of taking down the uploaded video, the policy application module 135 takes down 460a the uploaded video by removing the uploaded video from the video hosting site 100. Responsive to a policy 450b of allowing the uploaded video, the policy application module 135 keeps 460b the uploaded video in the video hosting site 100 and may mark the uploaded video as not eligible for generating revenue. The policy application module 135 monetizes 460c the uploaded video responsive to such a policy selection by the content owner by adding revenue generation means, such as adding pre-roll advertisements, to the uploaded video.

A content owner of reference content matched in the uploaded video may choose a different avenue to increase the value of the reference content. Responsive to the content owner selecting a social interaction-based policy, the policy application module 135 applies 460d the selected policy to the uploaded video by modifying the presentation of the uploaded video, such as by enabling the selected social interactions opportunities with the uploaded video by viewers of the uploaded video. The policy application module 135 may enforce a variety of interactions in accordance with the selected social interaction-based policy, such as adding a "Follow" button on the video frames of the uploaded video, where clicking the "Follow" button by a viewer of the uploaded video directs the viewer to the official version of the uploaded video within and/or outside a video hosting site hosting the official version.

The video hosting site 110 presents 470 the uploaded video processed by the associated policy to viewers of the uploaded video. For example, responsive to a user request for the uploaded video, the video serving module 110 of the video hosting site 100 presents the modified uploaded video to the user, who can interact with the modified uploaded video.

Social interaction-based policies enable content owners to obtain a variety of benefits within the video hosting site 100 and outside the video hosting site 100. The social interaction-based policies also enable the content uploaders to participate in monetization process through their uploaded videos that match reference content owned by the content owners subject to social interaction-based policies applicable to the uploaded videos.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method comprising:

providing a first user interface to a content owner, the first user interface presenting a plurality of policy options for a digital content of the content owner, the plurality of policy options comprising a first policy option to allow any content uploaded by a respective uploader user and corresponding to the digital content of the content owner to be presented, a second policy option to block any content uploaded by a respective uploader user, and a set of social interaction-based policy options comprising at least one of: following the content owner, approving the digital content of the content owner, or sharing the digital content of the content owner;

receiving, via the first user interface, a selection of the first policy option by the content owner to allow presentation of any content uploaded by a respective uploader user;

receiving, via the first user interface, a selection of one or more social interaction-based policy options by the content owner to allow viewer users viewing of the any content uploaded by a respective uploader user to perform a social interaction operation with respect to the digital content of the content owner when viewing the content uploaded by the respective uploader user; and storing the selected first policy option and the selected one or more social interaction-based policy options to cause a second user interface providing first content uploaded by a first uploader user and corresponding to the digital content of the content owner to include one or more user interface elements in accordance with the selected first policy option and the selected one or more social interaction-based policy options, wherein the second user interface is provided for presentation to a first viewer user, and wherein the one or more user interface elements of the second user interface allow the first viewer user to perform a corresponding social interaction operation with respect to the digital content of the content owner when viewing the first content uploaded by the first uploader user.

2. The method of claim 1, wherein the first content uploaded by the first uploader user is content uploaded to a content sharing site and determined to match the digital content of the content owner.

3. The method of claim 2, wherein following the content owner comprises following the content owner by the first viewer of the first content uploaded by the first uploader user on at least one of the content sharing site or a social network different from the content sharing site.

4. The method of claim 1, wherein the set of social interaction-based policy options further comprises at least one of: increasing favorable counts towards the digital content through an interaction with any content uploaded by the respective uploader user, commenting on the digital content by the viewer users viewing the digital content, and endorsing the digital content via a selection of an advertisement displayed together with corresponding content uploaded by the respective uploader user.

5. The method of claim 1, wherein the one or more user interface elements allowing the first viewer to perform a corresponding social interaction operation with respect to the digital content comprise a graphical representation having a link that links the first viewer to a web page showing the digital content.

6. The method of claim 1, wherein the plurality of policy options comprises a third policy option to add ads to corresponding content uploaded by the respective uploader user.

7. The method of claim 1, wherein the user interface presented to the content further presents metadata of the digital content, the metadata comprising an identifier of the content owner, an identifier of the digital content, digital content type and digital content name.

8. The method of claim 1, wherein the plurality of policy options further comprises a group policy option that allows the content owner to apply one or more selected policy options to a class of content comprising the digital content.

9. A non-transitory computer readable medium storing executable computer program instructions, which when executed by a processor, cause the processor to perform operations comprising:

providing a first user interface to a content owner, the first user interface presenting a plurality of policy options for a digital content of the content owner, the plurality of policy options comprising a first policy option to allow any content uploaded by a respective uploader user and corresponding to the digital content of the content owner to be presented, a second policy option to block any content uploaded by a respective uploader user, and a set of social interaction-based policy options comprising at least one of: following the content owner, approving the digital content of the content owner, or sharing the digital content of the content owner;

receiving, via the first user interface, a selection of the first policy option by the content owner to allow presentation of any content uploaded by a respective uploader user;

receiving, via the first user interface, a selection of one or more social interaction-based policy options by the content owner to allow viewer users viewing of the any content uploaded by a respective uploader user to perform a social interaction operation with respect to the digital content of the content owner when viewing the content uploaded by the respective uploader user; and storing the selected first policy option and the selected one or more social interaction-based policy options to cause a second user interface providing first content uploaded by a first uploader user and corresponding to the digital content of the content owner to include one or more user interface elements in accordance with the selected first policy option and the selected one or more social interaction-based policy options, wherein the second user interface is provided for presentation to a first viewer user, and wherein the one or more user interface elements of the second user interface allow the first viewer user to perform a corresponding social interaction operation with respect to the digital content of the content owner when viewing the first content uploaded by the first uploader user.

10. The non-transitory computer readable medium of claim 9, wherein the first content uploaded by the first uploader user is content uploaded to a content sharing site and determined to match the digital content of the content owner.

11. The non-transitory computer readable medium of claim 10, wherein following the content owner comprises following the content owner by the first viewer of the first content uploaded by the first uploader user on at least one of the content sharing site or a social network different from the content sharing site.

12. The non-transitory computer readable medium of claim 9, wherein the set of social interaction-based policy options further comprises at least one of: increasing favorable counts towards the digital content through an interaction with any content uploaded by the respective uploader user, commenting on the digital content by the viewer users viewing the digital content, and endorsing the digital content via a selection of an advertisement displayed together with corresponding content uploaded by the respective uploader user.

13. The non-transitory computer readable medium of claim 9, wherein the one or more user interface elements allowing the first viewer to perform a corresponding social interaction operation with respect to the digital content comprise a graphical representation having a link that links the first viewer to a web page showing the digital content.

14. The non-transitory computer readable medium of claim 9, wherein the plurality of policy options comprises a third policy option to add ads to corresponding content uploaded by the respective uploader user.

15. The non-transitory computer readable medium of claim 9, wherein the plurality of policy options further comprises a group policy option that allows the content owner to apply one or more selected policy options to a class of content comprising the digital content.

16. A system comprising:
a memory; and a processor, coupled to the memory, to perform operations comprising:

providing a first user interface to a content owner, the first user interface presenting a plurality of policy options for a digital content of the content owner, the plurality of policy options comprising a first policy option to allow any content uploaded by a respective uploader user and corresponding to the digital content of the content owner to be presented, a second policy option to block any content uploaded by a respective uploader user, and a set of social interaction-based policy options comprising at least one of: following the content owner, approving the digital content of the content owner, or sharing the digital content of the content owner;

receiving, via the first user interface, a selection of the first policy option by the content owner to allow presentation of any content uploaded by a respective uploader user;

receiving, via the first user interface, a selection of one or more social interaction-based policy options by the content owner to allow viewer users viewing of the any content uploaded by a respective uploader user to perform a social interaction operation with respect to the digital content of the content owner when viewing the content uploaded by the respective uploader user; and storing the selected first policy option and the selected one or more social interaction-based policy options to cause a second user interface providing first content uploaded by a first uploader user and corresponding to the digital content of the content owner to include one or more user interface elements in accordance with the selected first policy option and the selected one or more social interaction-based policy options, wherein the second user interface is provided for presentation to a first viewer user, and wherein the one or more user interface elements of the second user interface allow the first viewer user to perform a corresponding social interaction operation with respect to the digital content of the content owner when viewing the first content uploaded by the first uploader user.

17. The system of claim 16, wherein the first content uploaded by the first uploader user is content uploaded to a content sharing site and determined to match the digital content of the content owner.

18. The system of claim 17, wherein following the content owner comprises following the content owner by the first viewer of the first content uploaded by the first uploader user on at least one of the content sharing site or a social network different from the content sharing site.

19. The system of claim 16, wherein the set of social interaction-based policy options further comprises at least one of: increasing favorable counts towards the digital content through an interaction with any content uploaded by the respective uploader user, commenting on the digital content by the viewer users viewing the digital content, and endorsing the digital content via a selection of an advertisement displayed together with corresponding content uploaded by the respective uploader user.

20. The system of claim 16, wherein the one or more user interface elements allowing the first viewer to perform a corresponding social interaction operation with respect to the digital content comprise a graphical representation having a link that links the first viewer to a web page showing the digital content.

* * * * *